(12) United States Patent
Lee

(10) Patent No.: US 12,237,740 B2
(45) Date of Patent: Feb. 25, 2025

(54) 6-PHASE DRIVING MOTOR COMPRISING INPUT TERMINALS OF MULTIPLE CONDUCTOR MATERIALS

(71) Applicant: KOREA INSTITUTE OF INDUSTRIAL TECHNOLOGY, Cheonan-si (KR)

(72) Inventor: Eui Chun Lee, Daegu (KR)

(73) Assignee: KOREA INSTITUTE OF INDUSTRIAL TECHNOLOGY, Chungcheongnam-Do (KR)

( * ) Notice: Subject to any disclaimer, the term of this patent is extended or adjusted under 35 U.S.C. 154(b) by 215 days.

(21) Appl. No.: 17/913,157

(22) PCT Filed: Mar. 24, 2021

(86) PCT No.: PCT/KR2021/003615
§ 371 (c)(1),
(2) Date: Sep. 21, 2022

(87) PCT Pub. No.: WO2021/194241
PCT Pub. Date: Sep. 30, 2021

(65) Prior Publication Data
US 2023/0179135 A1 Jun. 8, 2023

(30) Foreign Application Priority Data
Mar. 24, 2020 (KR) .................. 10-2020-0035905

(51) Int. Cl.
*H02K 3/02* (2006.01)
*H02K 3/28* (2006.01)
(52) U.S. Cl.
CPC .............. *H02K 3/02* (2013.01); *H02K 3/28* (2013.01); *H02K 2213/03* (2013.01)

(58) Field of Classification Search
CPC .. H02K 3/02; H02K 3/28; H02K 3/50; H02K 3/505; H02K 3/52; H02K 3/521; H02K 3/522; H02K 5/225; H02K 2203/06; H02K 2203/09
See application file for complete search history.

(56) References Cited

U.S. PATENT DOCUMENTS

| 2013/0181569 A1* | 7/2013 | Nakagawa | H02K 3/00 174/68.2 |
| 2016/0126802 A1* | 5/2016 | Nagao | H02K 5/22 310/71 |
| 2016/0218579 A1* | 7/2016 | Peng | H02K 16/02 |

FOREIGN PATENT DOCUMENTS

| JP | 2012-110188 A | 6/2012 |
| JP | 2012-143090 A | 7/2012 |
| JP | 2015216714 A * | 12/2015 |
| JP | 2016171607 A * | 9/2016 |
| KR | 10-2003-0091060 A | 12/2003 |

(Continued)

OTHER PUBLICATIONS

Maruyama, Machine Translation of JP2016171607, Sep. 2016 (Year: 2016).*

(Continued)

*Primary Examiner* — Eric Johnson
(74) *Attorney, Agent, or Firm* — CANTOR COLBURN LLP

(57) ABSTRACT

The present invention relates to a driving motor, and more particularly, to a 6-phase driving motor including input terminals made of multiple conductor materials.

5 Claims, 3 Drawing Sheets

(56) References Cited

FOREIGN PATENT DOCUMENTS

| | | | |
|---|---|---|---|
| KR | 10-2007-0012742 A | 1/2007 | |
| KR | 10-2013-0061283 A | 6/2013 | |
| WO | WO-2018109909 A1 * | 6/2018 | ............... H02K 3/02 |

OTHER PUBLICATIONS

Ono, Machine Translation of WO2018109909, Jun. 2018, (Year: 2018).*
Asada, Machine Translation of JP2015216714, Dec. 2015 (Year: 2015).*
International Search Report mailed Jul. 5, 2021 for PCT/KR2021/003615.
Korean Office Action for KR Application No. 10-2020-0035905 mailed on May 13, 2021.

* cited by examiner

6-PHASE DRIVING MOTOR COMPRISING INPUT TERMINALS OF MULTIPLE CONDUCTOR MATERIALS

TECHNICAL FIELD

The present invention relates to a driving motor, and more particularly, to a 6-phase driving motor including input terminals made of multiple conductor materials and designed to be able to obtain high efficiency over the entire section including high-speed driving and low-speed driving.

BACKGROUND ART

In general, 3-phase AC electricity refers to a type of AC that travels with three single-phase AC sine waves, that is, an R-phase, an S-phase and a T-phase having phase angles of 120°. Further, a 3-phase driving motor that is driven by such 3-phase AC electricity has a structure that generates a rotating magnetic field at the wire of a stator and in which a rotor is rotated along the rotating magnetic field.

In detail, a 3-phase driving motor has several slots between a plurality of cores of a stator and coils are wound in the slots. Accordingly, an alternating current is applied to the coils of the stator, the stator generates a rotating magnetic field and rotation torque can be generated at a rotor by the rotating magnetic field.

Coils that are applied to such a 3-phase driving motor are usually made of the same material. For example, a low-speed high efficiency can be obtained when coils are all made of a copper material, and a high-speed high efficiency effect can be obtained when coils are made of an aluminum material.

Accordingly, driving motors of the related art have a problem that the field to which the driving motors are applied is limited by the material of coils.

Therefore, there is required a method for solving this problem.

DISCLOSURE

Technical Problem

The present invention is devised to solve the problems of the related art described above and an object of the present invention is to provide high efficiency over the entire section by designing a driving motor in 6 phases and applying different conductor materials to groups each composed of three phases.

The objects of the present invention are not limited to the object described above and other objects will be clearly understood by those skilled in the art from the following description.

Technical Solution

A 6-phase driving motor comprising input terminals of multiple conductor materials of the present invention for achieving the above object includes: a rotor; a stator including n cores (n is a natural number greater than 6) disposed to surround a circumference of the rotor; n coil units wound to surround the cores, respectively, and connected to each other by end turns; a first input terminal unit connected to three coil units selected from the n coil units, and including an input terminal made of a first conductor material; and a second input terminal unit connected to three coil units of other coil units other than the three coil units connected with the first input terminal unit, including an input terminal made of a second conductor material different from the first conductor material, and forming 6-phase input terminals together with the first input terminal.

In this case, the first input terminal unit and the second input terminal unit may be connected to coil units wound on cores positioned on an opposite side with each other with respect to a center point of the stator.

In addition, each of the first input terminal unit and the second input terminal unit may be connected to three continuously adjacent coil units.

In this case, the first conductor may be made of a material having higher conductivity than the second conductor.

Meanwhile, when the rotor is driven at a speed less than a predetermined reference speed, the 6-phase driving motor of the present embodiment may be controlled to apply a current through the first input terminal unit, and when the rotor is driven at a speed over a predetermined reference speed, the 6-phase driving motor of the present embodiment may be controlled to apply a current through the second input terminal unit.

In addition, when the rotor is driven at a maximum speed higher than the reference speed, the 6-phase driving motor may be controlled to apply a current through both the first input terminal unit and the second input terminal unit.

In this case, the first conductor may include a copper material and the second conductor may include an aluminum material.

The input terminal of the first input terminal unit and the input terminal of the second input terminal unit may include at least one or more of: a coil connecting portion connected with the coil unit; an extension portion having one end perpendicularly connected to the coil connecting portion in parallel with the end turn, and extending by a predetermined length; and a power connecting portion connected to the other end of the extension portion at a predetermined angle to extend in a lateral direction of the stator, and connected to an external power source.

Advantageous Effects

The 6-phase driving motor comprising input terminals made of multiple conductor materials of the present invention to solve the above problems has an advantage of providing high efficiency over the entire section from a low speed to a high speed by designing a drive motor in six phases and applying different conductor materials to groups each composed of 3 phases.

The effects of the present invention are not limited to those described above and other effects not stated herein may be apparently understood to those skilled in the art from the description of the claims.

MODE FOR INVENTION

Figure 1:
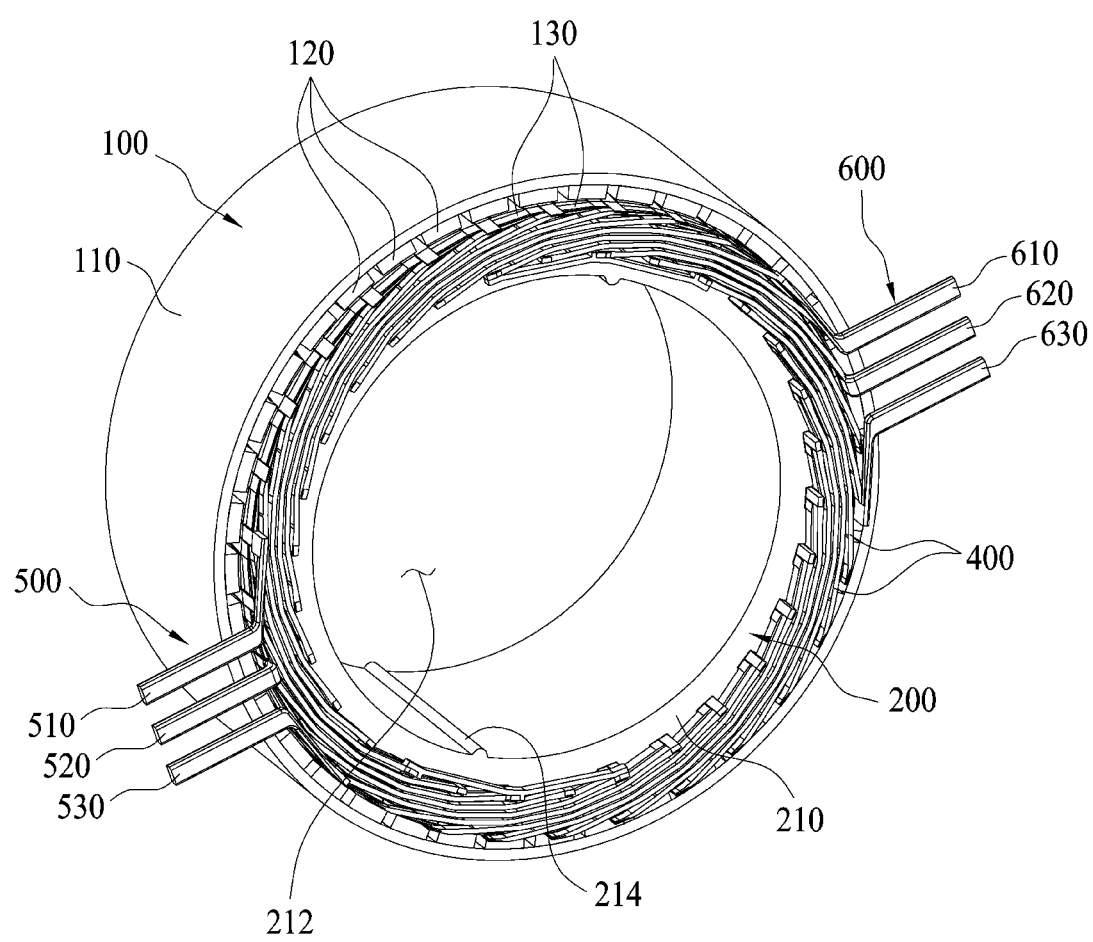
FIG. 1 is a view showing the shape of a 6-phase driving motor according to an embodiment of the present invention.

Hereafter, an preferred embodiment of the present invention that can achieve the objects of the present invention in detail is described with reference to the accompanying drawings. In the description of the present embodiment, the same components are given the same names and reference numerals, and are not repeatedly described.

FIG. 1 is a view showing the shape of a 6-phase driving motor according to an embodiment of the present invention.

As shown in FIG. 1, an electric motor according to an embodiment of the present invention includes a rotor 100, a stator 200, coil units 300, a first input terminal unit 500, and a second input terminal unit 600.

The stator 200 includes a ring-shaped inner circumferential part 210 and n cores (n is a natural number greater than 6) on which the coil units 300 mounted, and a plurality of such cores are arranged along the circumference of the inner circumferential part 210.

The rotor 100 includes an outer circumferential part 110 disposed to surround the circumference of the stator 200, and a plurality of permanent magnets 120 disposed between the outer circumferential part 110 and the stator 200. Here, the permanent magnets 120 may be naturally replaced with field wires.

That is, the electric motor according to the present embodiment may have a type in which the rotor 100 that rotates is disposed outside the stator 200, and the rotor 100 may be connected to an object to which rotation driving force is applied.

In addition, in the present embodiment, a hole 212 in which an external structure for fixing the stator 200 may be formed inside the inner circumferential part 210 of the stator 200. Further, an anti-rotation protrusion 214 that is coupled to an external structure and prevents rotation of the stator 200 is further disposed on the inner circumferential surface of the inner circumferential part 210.

Further, n coil units 300 (n is a natural number greater than 6) disposed at the stator 200 may be electrically connected by end turns 400 connecting each of the coil units 300 to each other.

Further, the first input terminal unit 500 may be connected to three coil units 300 selected from the n coil units 300 and the second input terminal unit 600 may be connected to the other three coil units 300.

Figure 2:
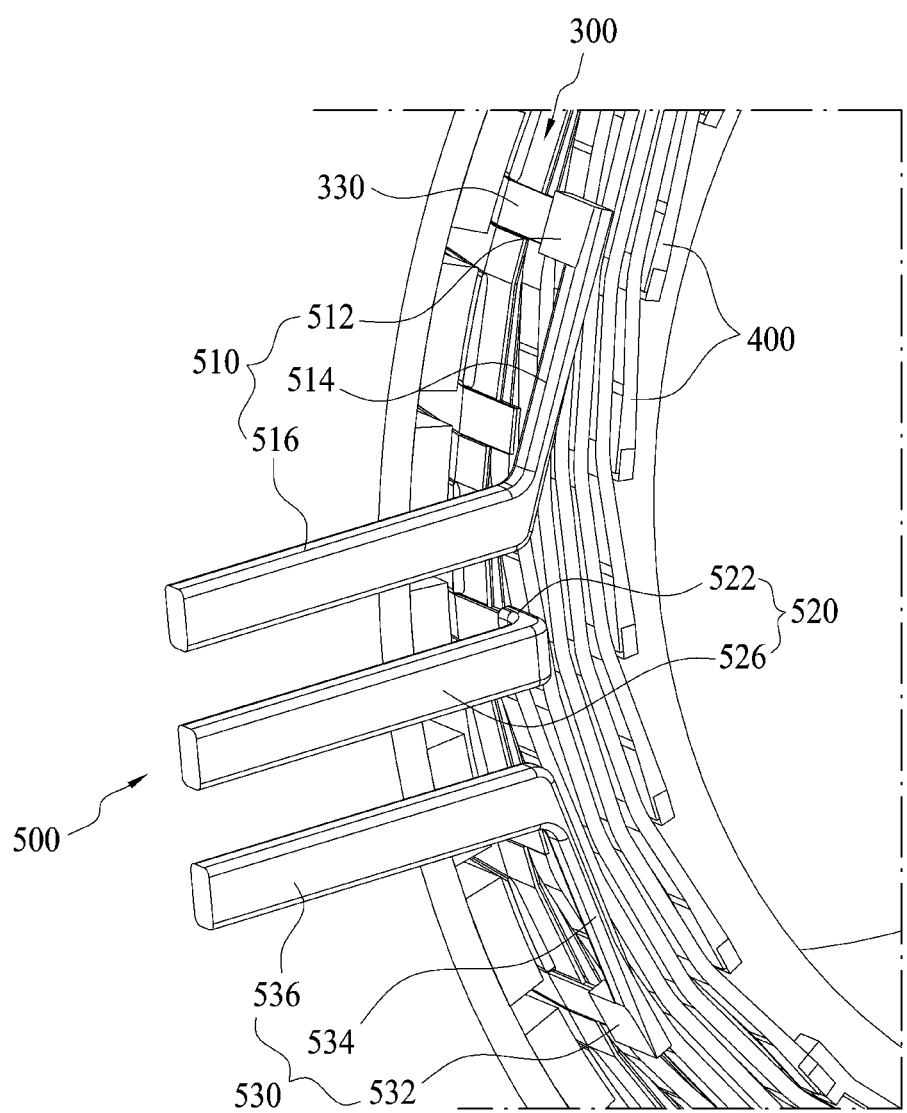
FIG. 2 is a view showing the shape of a first input terminal in the 6-phase driving motor according to an embodiment of the present invention.
Figure 3:
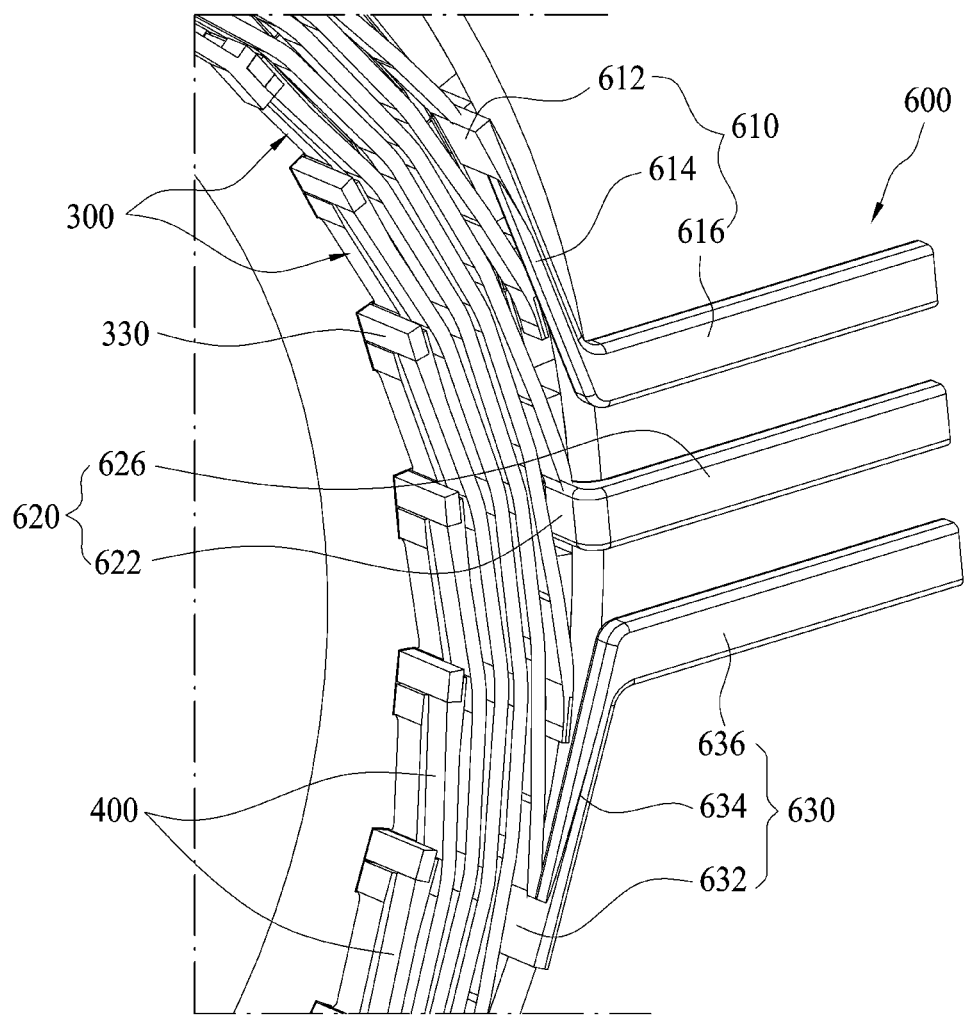
FIG. 3 is a view showing the shape of a second input terminal in the 6-phase driving motor according to an embodiment of the present invention.

FIG. 2 is a view showing the shape of the first input terminal unit 500 in the 6-phase driving motor according to an embodiment of the present invention and FIG. 3 is a view showing the second input terminal unit 600 in the 6-phase driving motor according to an embodiment of the present invention.

As shown in FIGS. 2 to 3, the first input terminal unit 500 includes input terminals 510, 520, and 530 that are connected to three coil unit 300 selected from the n coil units 300, respectively, and are made of a first conductor material. The input terminals are, for the convenience of description, referred to as a 1-1 input terminal 510, a 1-2 input terminal 520, and a 1-3 input terminal.

Further, the second input terminal unit 600 includes input terminals 610, 620 and 630 that are respectively connected to three coil unit 300 selected from the other coil units 300 other than the three coil unit 300 to which the first input terminal unit 500 is connected, and are made of a second conductor material that is different from the first conductor. The input terminals 610, 620 and 630 are, for the convenience of description, referred to as a 2-1 input terminal 610, a 2-2 input terminal 620 and a 2-3 input terminal 630.

That is, accordingly, the first input terminal unit 500 and the second input terminal unit 600 together can form 6-phase input terminals.

In particular, in the present embodiment, the first input terminal unit 500 and the second input terminal unit 600 have a type connected to coil units 300 wound on cores positioned opposite each other with the center point of the stator 200 therebetween.

The reason is for maximally secure a gap distance of the first input terminal unit 500 and the second input terminal unit 600 such that the connection structures thereof do not interfere with each other and the center of gravity of the entire driving motor is not biased to a side.

Further, each of the input terminals 510, 520 and 530 of the first input terminal unit 500 and the input terminals 610, 620 and 630 of the second input terminal unit 600 may be connected to three continuously adjacent coil units 300.

This is for minimizing the areas occupied by the first input terminal unit 500 and the second input terminal unit 600 and making the connection structure as simple as possible.

Meanwhile, each of the 1-1 input terminal 510 and the 1-3 input terminal 530 of the first input terminal unit 500 includes coil connecting portions 512 and 532 connected with connecting portions 330 of the coil units 300, extension portions 514 and 534 having one end perpendicularly connected to the coil connecting portions 512 and 532 in parallel with the end turns 400 to extend by a predetermined length, and power connecting portions 516 and 536 connected to the other end of the extension portions 514 and 534 at a predetermined angle to extend in the lateral direction of the stator 200, and connected to external power source.

Further, the 1-2 input terminal 520 of the first input terminal unit 500 includes a coil connecting portion 522 connected to the connecting portion 330 of the coil unit 300, and a power connecting portion 526 connected to the coil connecting portion 522 at a predetermined angle to extend in the lateral direction of the stator 200 and connected to an external power source, and does not have an extension portion.

Accordingly, since the 1-1 input terminal 510, the 1-2 input terminal 520, and the 1-3 input terminal 530 extend in the lateral direction of the stator 200 with the power connecting portions 516, 526 and 536 in parallel, a more simple connection structure can be provided.

Similarly, each of the 2-1 input terminal 610 and the 2-3 input terminal 630 of the second input terminal unit 600 includes coil connecting portions 612 and 632 connected with connecting portions 330 of the coil units 300, extension portions 612 and 632 having one end perpendicularly connected to the coil connecting portions 612 and 632 in parallel with the end turns 400 to extend by a predetermined length, and power connecting portions 616 and 636 connected to the other end of the extension portions 614 and 634 at a predetermined angle to extend in the lateral direction of the stator 200 and connected to an external power source.

Further, the 2-2 input terminal 620 of the second input terminal unit 600 includes a coil connecting portion 622 connected to the connecting portion 330 of the coil unit 300, and a power connecting portion 626 connected to the coil connecting portion 622 at a predetermined angle to extend in the lateral direction of the stator 200 and connected to an external power source, and does not have an extension portion.

Accordingly, since the 2-1 input terminal 610, the 2-2 input terminal 620 and the 2-3 input terminal 630 extend in the lateral direction of the stator 200 with the power connecting portions 616, 626 and 636 in parallel, similar to the first input terminal unit 500, a more simple connection structure can be provided.

Meanwhile, as described above, the first input terminal unit 500 may be made of a first conductor material and the second input terminal unit 600 may be made of a second conductor material that is different from the first conductor material.

In this case, the first conductor may be made of a material that is higher in conductivity than the second conductor. Accordingly, when the rotor 100 is driven at a speed less than a predetermined reference speed, the 6-phase driving motor of the present embodiment can be controlled to apply a current through the first input terminal unit 500, and when the rotor 100 is driven at a speed over the predetermined reference speed, the 6-phase driving motor can be controlled to apply a current through the second input terminal unit 600.

Meanwhile, when the rotor 100 is driven at a maximum speed higher than the reference speed, the 6-phase driving motor can be controlled to apply a current through both the first input terminal unit 500 and the second input terminal unit 600.

That is, the 6-phase driving motor of the present embodiment can have a selective current appliance characteristic in which a current is applied through the high-conductive first input terminal unit 500 at a low speed, a current is applied through a low-conductive second input terminal unit 600 at a high speed, and a current is applied through both the first input terminal unit 500 and the second input terminal unit 600 at the maximum output, which is for providing high efficiency over the entire section by solving the problem of AC resistance.

In particular, the first conductor includes a copper material and the second conductor includes an aluminum material in the present embodiment, but this is not limited by the present embodiment.

Although preferred embodiments of the present disclose were described above, it would be apparent to those skilled in the art that the present invention may be achieved in other specific types without departing from the scope or spirit other than the embodiments described above. Accordingly, the embodiments described above should be considered as being exemplifying rather than limiting, so the present invention may be changed within the range of the claims and the equivalent range without being limited to the above description.

110: outer circumferential part
120: permanent magnet
200: stator
210: inner circumferential part
212: hole
214: anti-rotation protrusion
300: coil unit
400: end turn
500: first input terminal unit
510: 1-1 input terminal
520: 1-2 input terminal
530: 1-3 input terminal
600: second input terminal unit
610: 2-1 input terminal
620: 2-2 input terminal
630: 2-3 input terminal

The invention claimed is:

1. A 6-phase driving motor comprising input terminals of multiple conductor materials, the 6-phase driving motor comprising:
    a rotor;
    a stator including n cores (n is a natural number greater than 6) disposed to surround a circumference of the rotor;
    n coil units wound to surround the cores, respectively, and connected to each other by end turns;
    a first input terminal unit connected to three coil units selected from the n coil units, and including an input terminal made of a first conductor material; and
    a second input terminal unit connected to three coil units of the other coil units other than the three coil units connected with the first input terminal unit, including an input terminal made of a second conductor material different from the first conductor material, and forming 6-phase input terminals together with the first input terminal unit,
    wherein the first conductor is made of a material having higher conductivity than the second conductor,
    wherein when the rotor is driven at a speed less than a predetermined reference speed, the 6-phase driving motor is controlled to apply a current through the first input terminal unit, and when the rotor is driven at a speed over the predetermined reference speed, the 6-phase driving motor is controlled to apply a current through the second input terminal unit,
    wherein the input terminal of the first input terminal unit and the input terminal of the second input terminal unit comprise:
    a coil connecting portion connected with the coil unit;
    an extension portion having one end perpendicularly connected to the coil connecting portion in parallel with the end turn, and extending by a predetermined length; and
    a power connecting portion connected to the other end of the extension portion at a predetermined angle to extend in a lateral direction of the stator, and connected to an external power source.

2. The 6-phase driving motor of claim 1, wherein the first input terminal unit and the second input terminal unit are connected to coil units wound on cores positioned on an opposite side with each other with respect to a center point of the stator.

3. The 6-phase driving motor of claim 1, wherein each of the first input terminal unit and the second input terminal unit are connected to three continuously adjacent coil units.

4. The 6-phase driving motor of claim 1, wherein when the rotor is driven at a maximum speed higher than the reference speed, the 6-phase driving motor is controlled to apply a current through both the first input terminal unit and the second input terminal unit.

5. The 6-phase driving motor of claim 1, wherein the first conductor comprises a copper material and the second conductor comprises an aluminum material.

* * * * *